F. NORMAN.
ACETYLENE GENERATING AND SUPPLY SYSTEM FOR AUTOMOBILES.
APPLICATION FILED JUNE 24, 1916.
1,303,946.
Patented May 20, 1919.
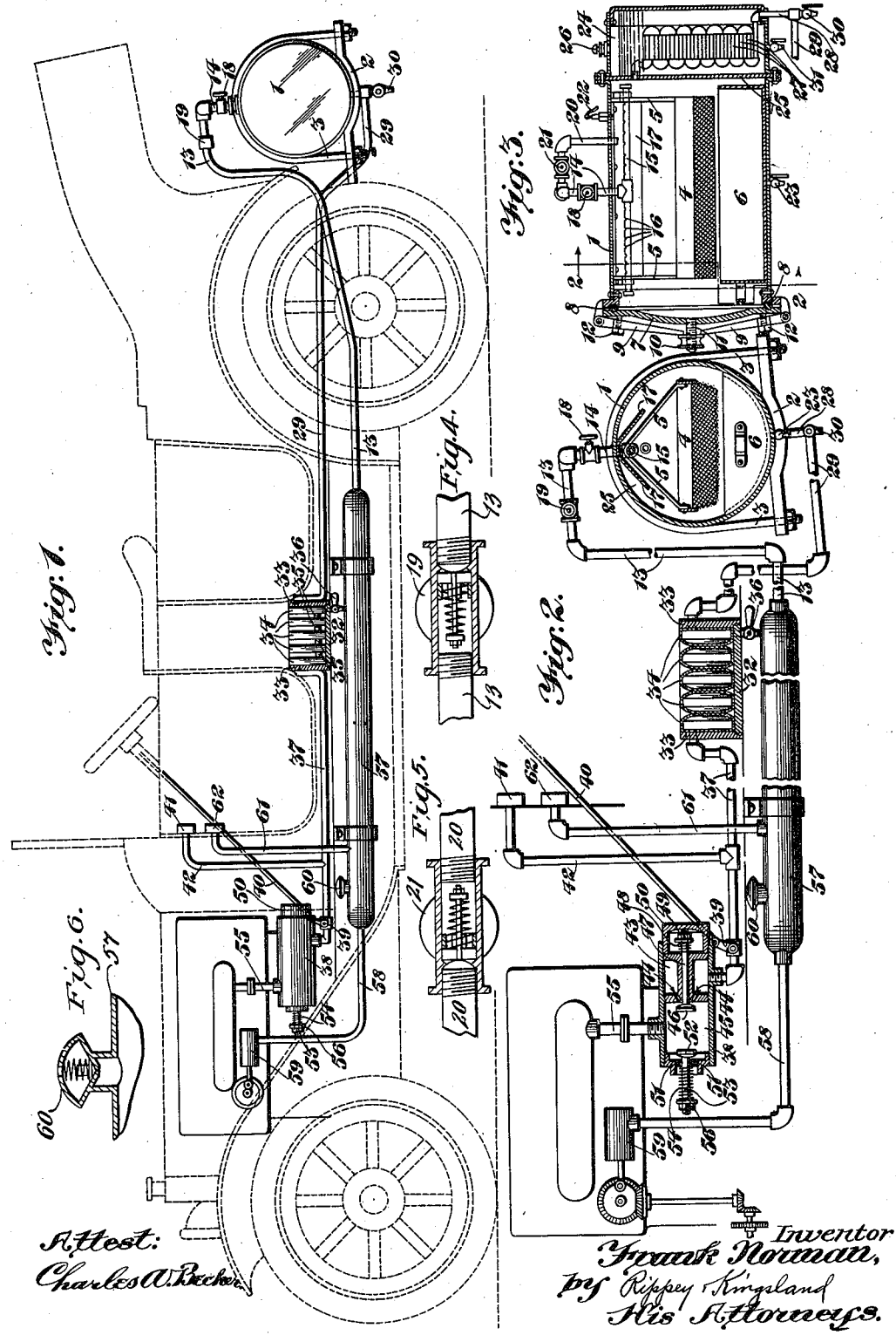

UNITED STATES PATENT OFFICE.

FRANK NORMAN, OF DES MOINES, IOWA, ASSIGNOR, BY DIRECT AND MESNE ASSIGNMENTS, OF SEVEN THIRTY-SECONDS TO WILLIAM A. McATEE, FOUR THIRTY-SECONDS TO ALPHONSO B. LOVAN, TWO THIRTY-SECONDS TO GEORGE W. YOUNG, AND ONE THIRTY-SECOND TO WILLIAM T. SHORES, ALL OF SPRINGFIELD, OHIO, TWO THIRTY-SECONDS TO CLARENCE H. NICHOLS, OF NEW YORK, N. Y., AND EIGHT THIRTY-SECONDS TO OTHO R. McATEE, OF SPRINGFIELD, MISSOURI.

ACETYLENE GENERATING AND SUPPLY SYSTEM FOR AUTOMOBILES.

1,303,946.　　　　　Specification of Letters Patent.　Patented May 20, 1919.

Application filed June 24, 1916. Serial No. 105,609.

*To all whom it may concern:*

Be it known that I, FRANK NORMAN, a citizen of the United States, residing at the city of Des Moines, county of Polk, and State of Iowa, have invented a new and useful Acetylene Generating and Supply System for Automobiles, of which the following is a specification.

This invention relates to acetylene gas generating and supply systems for internal combustion engines of the type employed upon automobiles and other vehicles.

An object of the invention is to provide an acetylene gas generating and supply system especially adapted for use in connection with internal combustion engines for propelling any kind of vehicle or vessel, with which such engines have been employed, and provided with a generator and a gas mixer, in combination with an expansible gas receiver in the supply passage from the generator to the mixer arranged to expand under pressure of the gas therein and to contract by inherent resiliency of the material forming the walls of the receiver, in order to force the gas with proper and approximately uniform pressure through the mixer and into the manifold of the engine.

Another object of the invention is to provide a novel and efficient acetylene gas generating and supply system combined with the internal combustion engine of an automobile or other vehicle or vessel and comprising a generator including a carbid holder, and water supply passages in which the carbid holder is controlled by the motion of the vehicle or vessel to agitate and distribute the carbid so that all of it will be subjected to the action of the water, automatic means for stopping the flow of the water into the generator by the pressure of the gas, and an expansible gas receiver located in the supply passage leading to the engine for receiving the gas and forcing it with approximately uniform pressure toward the engine irrespective of the variations in the pressure of the gas within the generator.

A further object of the invention is to provide an acetylene gas generating and supply system for internal combustion engines comprising a generator, a water and pressure tank adapted to contain water and having a supply pipe leading to the generator and receiving air pressure from a pump device driven by the engine, whereby the supply of water to the generator is maintained constantly or continuously, automatic means for stopping the supply of water when the pressure of the gas in the generator exceeds that of the water in the supply pipe, and a gas receiver in the passage leading to the engine arranged to receive the gas and to be expanded thereby and to force the gas with a constant and uniform pressure toward the engine by the inherent contracting qualities of the walls of the receiver.

A further object is to provide an acetylene gas generating and supply system of the character mentioned including a mixer for mixing the air and gas in proper proportions and arranged to receive the gas under pressure applied by the expansible gas receiver, whereby the gas is forced through the mixer and into the manifold of the engine.

Additional objects of general and specific nature will appear from the following detailed description, reference being made to the accompanying drawings illustrating one embodiment of the invention, in which—

Figure 1 is a view illustrating the generating system applied to the engine of an automobile.

Fig. 2 is a view illustrating certain essential parts of the invention in section, the pipes being broken to permit the different parts of the system to be illustrated in proximity to each other.

Fig. 3 is a longitudinal sectional view of the generator.

Fig. 4 is a sectional view illustrating the construction of the check valve in the pipe connecting the water tank with the generating tank.

Fig. 5 is a sectional view illustrating the construction of the check valve in the pipe for admitting gas pressure against the effluent side of the valve shown in Fig. 4.

Fig. 6 is a sectional view illustrating the construction of a well known pressure regulator in connection with the water tank.

While I have illustrated the invention applied to an automobile for generating acetylene gas and supplying it under pressure to the engine, it will be readily understood that I have illustrated the invention applied to an automobile for purposes of convenience only, and that the invention may be used with equal advantage in connection with the engines of other vehicles or vessels, such for instance as air ships or boats, and also with stationary engines. Therefore, in describing the invention in the environment in which it is illustrated, it will be understood that the use of the invention is in no sense limited or restricted.

As illustrated the invention comprises an acetylene gas generating tank 1 mounted upon supports 2 in connection with the frame of an automobile and retained in position by removable bands or straps 3 applied in a well understood manner. The tank 1 incloses a carbid holder 4 pivotally supported by bails 5 and arranged to be swung into contact with the side walls of the tank by the movement or vibration of the vehicle. Thus the carbid is agitated or moved in the carbid holder as an incident to the vibration of the vehicle, so that all of the carbid is brought into position to receive the water spray, thus preventing the water from concentrating upon a small quantity or portion of the carbid. The carbid holder is provided with a bottom in the form of a screen or grate, through which the ashes are shaken into the ash pan 5 which is removable from the tank. One end of the tank is closed by a removable closure 7 provided with appropriate packing 8 for a hermetic joint, the closure being retained in position by levers 9 pivotally supported by the tank and compressed into clamping position by a clamp device 10 which operates upon a threaded stud 11 carried by the closure. The levers 9 are provided with adjustable compression elements 12 adapted to bear against the closure and press it into position.

A water supply pipe 13 has an extension 14 into the tank and arranged to discharge water into the water spray pipe 15 arranged horizontally in the tank near the upper side thereof. The water spray pipe in the particular form illustrated constitutes the support for the bails 5. Said spray pipe is formed with numerous perforations 16 through its upper side, so that the water entering through the water supply pipe under pressure will be forced in the form of a spray toward the upper side of the tank and distributed by deflectors 17 over a relatively large area of the carbid. A manipulative valve 18, in the extension 14, is adjustable to open and close the passage optionally. A check valve device 19 of the usual and well known construction is arranged in the pipe 13 to open under the pressure of the water in order to permit the water to enter the extension 14 and the spray pipe 15. A gas pipe 20 constitutes a communication from the tank into the union between the pipe 13 and the extension 14, and is provided with a valve 21 which closes under the pressure of the water entering the extension 14, so that the water cannot be discharged into the tank through the pipe 20. However, when the pressure of the gas within the tank rises above the pressure of the water in the supply pipe, the valve 21 is opened by the pressure of the gas, so that the gas may enter the pipe 13 and close the valve 19 and thereby stop the flow of the water. However, when the pressure of the gas within the tank becomes reduced below the pressure of the water in the supply pipe, the valve 12 is again opened and the valve 21 closed by the water pressure, thus permitting the water again to enter the spray pipe.

The generating tank 1 is provided with a safety valve 22 for relieving automatically excessive pressure in the tank, and is also provided with a valve controlled drain outlet 23 for withdrawing any accumulations of water from the tank.

The generating tank is divided from the water chamber 24 by an impervious partition 25. The water chamber 24 is provided with a water filling passage 26 and incloses the series of submerged coils of pipe 27, the upper one of which opens into the generating chamber and the lower one of which has an extension 28 passing through the lower wall of the water chamber and communicating with a service pipe 29 which leads to the gas receiver. Since the walls of the water chamber are cooled by the air, thus cooling the water, the temperature of the gas is reduced thereby. The connection between the pipes 28 and 29 is provided with a valve controlled drain outlet 30 for withdrawing any condensation or deposits which accumulate within the pipes. The bottom of the water chamber is also provided with a valve controlled drain outlet 31.

The service pipe 29 leads to the expansible gas receiver which is mounted in a box including a bottom 32, constituting a support for the receiver and side walls 33 for preventing lateral movement of the side chambers of the receiver. The receiver is composed of a series of chambers 34 with expansible side walls, the adjacent ones of which communicate with each other at alternately opposite ends through passages 35, by which means the receiver is made to serve as a tortuous passage for cooling the gas in addition to the functions of maintaining a reserve supply of the gas and of forcing the gas with continuous and uniform pressure toward the engine. The chambers 34 are normally spaced apart so that when the gas enters the chambers, the expansible side walls thereof are expanded or inflated into contact with each other, as will be understood by reference to Fig. 2. Since the walls of the chambers are composed of resilient material and are normally in contracted relation, it will be understood that the resiliency of the walls constantly exerts or applies pressure to the gas in order to force the gas with uniform pressure toward the mixer and the engine. At least one of the chambers is provided with a valve controlled drain outlet 36, through which the accumulations or deposits of moisture may be withdrawn.

A pipe 37 leads from the last chamber 34 of the series into a cylinder 38 constituting the casing of the mixer. The pipe 37 is controlled by a throttle valve 39 operated by the usual manipulative throttle connections 40 extending through the steering column. A pressure gage 41 has communication with the pipe 37 through a pipe 42, so that the pressure of the gas into the air mixer and engine is at all times visually indicated.

The mixer includes a receiving chamber 43 in the casing 38 having passages 44 opening into the mixing chamber 45 and controlled by a puppet valve 46. The puppet valve 46 is attached to a stem 47 passing through axial openings in the walls of the receiving chamber and encircled by a spring 48 which yields to the pressure of the gas against the valve, to enable the valve to open and admit the gas into the mixing chamber. The tension of the spring 48 may be varied by a tension regulating device 49 mounted upon the stem of the valve and adjustable to vary the tension of the spring at will. A cap 50 has threaded connection with the end of the casing 38 and incloses the end of the valve stem 47, the spring 48 and regulator 49, and also prevents any escape of the gas through the bearing in which the valve stem is mounted.

The opposite end wall of the mixing chamber 45 is provided with a series of air inlet passages 51 which are controlled by a puppet valve 52 mounted on a stem 53 extending through and opening in the end wall which constitute a bearing for the stem. A spring 54 encircling the valve stem 53 normally holds the valve in position to close the air passages 51, but when the admixture within the mixing chamber is withdrawn by operation of the engine, the spring 54 yields to the pressure of the air against the valve 52, so that a proper proportion of air enters the mixing chamber to be mixed with the gas entering said chamber through the passages 44. The mixture from the mixing chamber enters the manifold of the engine through a connecting pipe or passage 55. The tension of the spring 54 may be varied by a regulating device 56 mounted upon the valve stem and settable in different positions thereon.

As hereinbefore stated the water is supplied to the generating tank under pressure afforded by mechanism driven by the engine. The water is contained in a water and pressure tank 57 opening into the pipe 13 and having an air pressure pipe 58 receiving air forced therein by a pump 59 illustrated diagrammatically and driven by the engine in a well understood manner. Since the specific connections or mechanim for driving the pump by the engine are not claimed in this application it is, of course, unnecessary to illustrate or describe such connections or mechanism specifically. The tank 57 is equipped with a pressure regulator 60 of the usual well known construction and is also provided with a pipe 61 leading to an air pressure gage 62, so that the pressure in the tank is at all times visually indicated. The regulator 60 controls the pressure of the water so that the pressure of the gas in the generator may close the valve 19 when the desired pressure of gas in the generator is attained, even while the pump 59 continues in operation.

It is apparent that the construction and arrangement of the various elements comprising the invention may be varied without departure from the scope and nature of the invention. Therefore, I do not restrict myself to specific features, but what I claim and desire to secure by Letters Patent of the United States, is:—

1. The combination with an engine, of an acetylene gas generator, a device operated by the engine for forcing water into the generator, means for supplying the engine with gas from the generator, a device controlled by the pressure of the gas in the generator for preventing the flow of water into the generator, when the gas pressure in the generator exceeds the pressure of the water, and while said first-named device continues in operation, and means for controlling the pressure of the water, whereby said last-named device will be operated by the pressure of the gas to prevent the flow of water into the generator while said first-named device continues in operation, when the desired pressure of gas in the generator is attained.

2. The combination with an engine, of an acetylene gas generator, a passage for conducting water into the generator, a device operated by the engine for forcing water through said passage into the generator, means for supplying the engine with gas from the generator, means for modifying the pressure of the gas from the generator to equalize the pressure of the gas toward the engine under varying pressures of the gas in the generator, a device controlled by the pressure of the gas in the generator for preventing the flow of water into the generator, when the gas pressure in the generator exceeds the pressure of the water in said passage, and while said first-named device continues in operation, and means for controlling the pressure of the water in said passage, whereby said last-named device will be operated by the pressure of the gas to prevent the flow of water into the generator while said first-named device continues in operation, when the desired pressure of gas in the generator is attained.

In witness whereof I have signed this specification in the presence of two subscribing witnesses.

FRANK NORMAN.

Witnesses:
  CHAS. MCKNOLLY,
  GLADYS DAILY.